United States Patent [19]

den Hollander

[11] 4,234,824
[45] Nov. 18, 1980

[54] COMBINED LINEARITY AND SIDE PINCUSHION CORRECTION ARRANGEMENT

[75] Inventor: Willem den Hollander, Schlieren, Switzerland

[73] Assignee: RCA Corporation, New York, N.Y.

[21] Appl. No.: 32,252

[22] Filed: Apr. 23, 1979

[30] Foreign Application Priority Data

Jan. 10, 1979 [GB] United Kingdom ............... 924/79

[51] Int. Cl.³ ........................................... H01J 29/70
[52] U.S. Cl. ..................................... 315/371; 315/400
[58] Field of Search ............................... 315/371, 400

[56] References Cited

U.S. PATENT DOCUMENTS

| | | | |
|---|---|---|---|
| 3,346,765 | 10/1967 | Barkow | 315/400 |
| 3,427,497 | 2/1969 | Gostyn | 315/400 |
| 3,732,458 | 5/1973 | Wolber | 315/400 X |
| 3,968,402 | 7/1976 | Sahara et al. | 315/400 |
| 4,024,432 | 5/1977 | Boekhorst | 315/371 |

FOREIGN PATENT DOCUMENTS 21328  6/1972  Japan ........................................ 315/400

Primary Examiner—Malcolm F. Hubler
Attorney, Agent, or Firm—Eugene M. Whitacre; Paul J. Rasmussen; Joseph J. Laks

[57] ABSTRACT

A linearity inductance and a side pincushion correction inductance are wound on outer leg core portions of a single E-core. A magnet biases the linearity inductance core portion for saturating that portion each horizontal deflection cycle for producing a linearity corrected horizontal deflection current. A high reluctance path for flux mutually linking both the linearity and side pincushion correction windings is provided by the E-core configuration. The portion of the flux generated by the side pincushion correction winding that does flow in the linearity winding core portion compensates for undesirable vertical rate changes in the magnetic bias of the linearity winding core portion.

8 Claims, 6 Drawing Figures

COMBINED LINEARITY AND SIDE PINCUSHION CORRECTION ARRANGEMENT

BACKGROUND OF THE INVENTION

This invention relates to combined side pincushion and linearity correction magnetic structures and circuits.

In typical color television receivers, two separate magnetic components are connected in series with the horizontal deflection winding, namely, a linearity coil and an East-West or side pincushion correction coil or transformer. The linearity coil may be wound on a rod or H-core with one or more bias magnets located adjacent the core. The East-West coil may be wound on a separate ferrite rod core or on a closed core like a UU or an EE-core. The East-West coil may be part of an ITR controlled E-W modulator circuit such as described in U.S. Pat. No. 4,088,931 by P. E. Haferl or may be part of a diode modulator circuit such as described in U.S. Pat. No. 3,906,305 by A. H. H. J. Nillesen.

East-West correction results in a vertical rate modulation of the horizontal deflection or scanning current. The vertical rate modulation of the horizontal scanning current, however, causes an undesirable vertical rate modulation of the magnetic bias of the linearity coil. The effect of the linearity coil is thus different at the top or bottom of the raster than in the center, resulting in uncorrected raster distortion. To correct for this effect, the linearity coil biasing is sometimes modulated at a vertical rate by coupling the E-W modulator current through an extra winding on the linearity coil, as described, for example, in U.S. Pat. No. 4,024,432, by A. Boekhorst.

It is desirable, however, to combine the functions of both side pincushion correction and linearity correction into one structure which also eliminates the aforementioned raster distortion.

SUMMARY

First and second windings are wound around respective first and second core portions of a magnetic core. The first winding is adapted for coupling to a horizontal deflection winding. A magnetic biasing structure biases the first core portion such that the core portion is saturated each horizontal deflection cycle for providing horizontal scanning current linearity correction. The second winding is adapted for receiving a current with a vertical rate correction component. The biasing structure and the first and second core portions are configured to establish a high reluctance path for flux mutually linking both windings. A portion of the flux generated by the correction current that does flow in the first core portion compensates for undesirable changes in magnetic bias of the first core portion.

DESCRIPTION OF THE INVENTION

Figure 1:
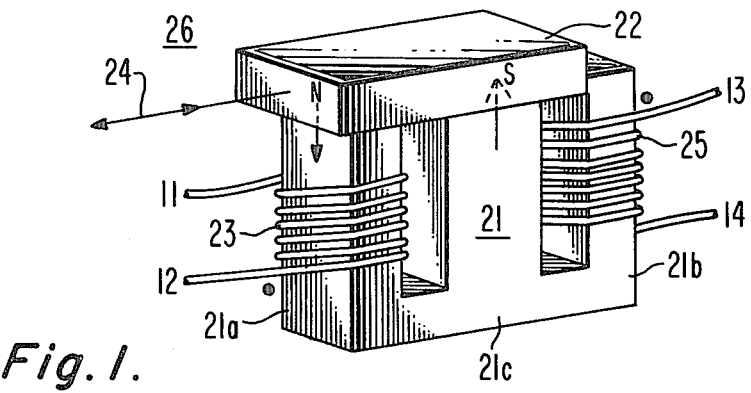
FIG. 1 illustrates a combined linearity and side pincushion correction magnetic structure embodying the invention.

A combined linearity and side pincushion correction structure 26 embodying the invention and constructed on a single magnetic core 21 is illustrated in FIG. 1. An L-shaped portion 21a of an E-core 21 is magnetically biased by a permanent magnet 22, which has magnetic poles located on opposite ends of the surface that is in contact with the core. A south pole of magnet 22 is, illustratively, located adjacent a center leg 21c of E-core 21 and a north pole is located adjacent the outer L-shaped leg 21a. A winding 23, wound around outer leg 21a of core 21, is coupled in series with a horizontal deflection winding 50 of a horizontal deflection circuit 51, as illustrated in the electrical schematic of FIG. 2. A lead conductor 12 of winding 23 is coupled to one terminal of horizontal deflection winding 50. Another terminal of horizontal deflection winding 50 is coupled at a terminal 61 to a conventional horizontal deflection generator 52 through a trace capacitor 51, for producing horizontal scanning current in deflection winding 50. A horizontal retrace capacitor 60 is coupled to terminal 61.

The magnetic field in the core developed by permanent magnet 22 and by the current flowing in winding 23 is such that at the beginning of horizontal scan the core portion 21a is near saturation. Towards the center of horizontal scan, core portion 21a saturates more and more, until, in the second half of horizontal scan, core portion 21a is substantially in saturation. Center leg 21c because of its larger cross-section is not saturated and thus functions as a magnetic shunt for the entire scan. The effect of the inductance variation of outer leg 21a is that during the first half of horizontal scan, a decreasing linearity inductance is in series with the deflection winding, while during the second half of scan, because of saturation, little inductance is present. This changing inductance during each horizontal scan causes a decreased horizontal deflection current amplitude in the first half of scan which compensates for the nonlinearity of the deflection current in the second half of scan caused by the cumulative losses in the deflection winding and the trace switch for example. Sliding magnet 22 as indicated in FIG. 1 along the line 24 changes the saturation point slightly for adjusting the linearity correction. Winding 23 thereby functions as the required saturable linearity inductance in series with horizontal deflection winding 50.

When the linearity inductor is wound around outer leg 21a of E-core 21, another outer leg, 21b, is free. Magnet 22 is not in close contact with leg 21b. Thus, outer leg 21b, as well as the previously described center leg 21c, is also not in saturation. A winding 25 is then wound around outer leg 21b, as illustrated in FIG. 1. Loose magnetic coupling exists between core portions 21a and 21b as defined by the geometry of the core. Thus winding 25 may function as the substantially linear or non-saturated inductor of an East-West modulator circuit.

Figure 2:
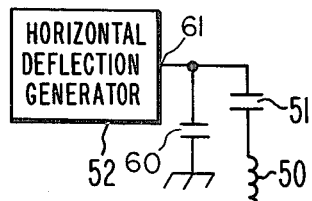
FIG. 2 illustrates an electrical schematic of a deflection circuit including a modulator circuit and a combined linearity and side pincushion correction arrangement embodying the invention, the arrangement being associated with the magnetic structure of FIG. 1.
Figure 2:
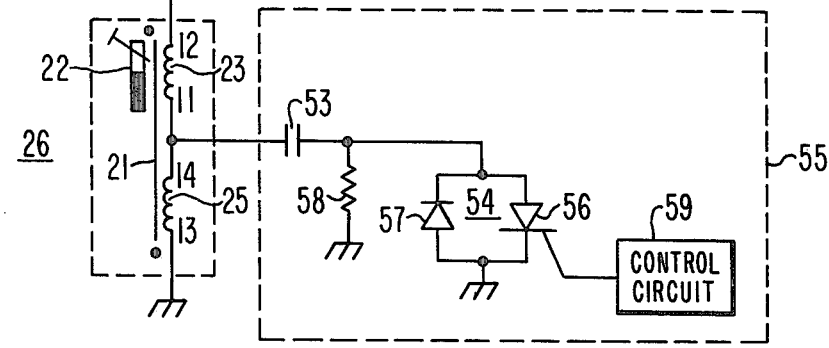

As illustrated in FIG. 2, a lead conductor 14 of winding 25 is coupled through a capacitor 53 to a bi-directionally conductive ITR switch 54 of an East-West or side ITR modulator circuit 55. Switch 54 comprises an SCR 56 and an oppositely poled diode 57. A resistor 58 is coupled across ITR switch 54. A control circuit 59 is coupled to a gate of SCR 56 and turns on SCR 56 at a vertically varying instant with horizontal retrace. The length of time within horizontal retrace that the inductance of winding 25 is coupled to horizontal deflection winding 50 is thereby varied at a vertical rate, thereby modulating the horizontal scanning current amplitude at a vertical rate for providing side pincushion distortion correction. Control circuit 59 and East-West ITR modulator 55 are fully described in the aforementioned U.S. Pat. No. 4,088,931 of P. E. Haferl.

To prevent the vertical modulation component of the horizontal scanning current flowing in linearity inductance winding 23 from undesirably changing the magnetic bias of core portion 21a from top to bottom of raster scan, a compensating magnetic flux with a compensating vertical rate flux component is made to flow in core portion 21a. This compensating flux is developed by the current flowing in side pincushion correction inductance winding 25, which has flowing in it the horizontal scanning current during each horizontal trace interval.

Lead conductor 14 of side pincushion inductance winding 25 is coupled to a lead conductor 11 of linearity inductance winding 23, as illustrated in FIGS. 1 and 2. A lead conductor 13 of winding 25 is coupled to ground. During each horizontal trace interval, horizontal deflection winding 50, linearity inductance winding 23, and side pincushion inductance winding 25 are series connected. The vertically modulated horizontal scanning current flows in all three windings. With the winding polarities of windings 23 and 25 as indicated by the polarity dots in FIGS. 2 and 3, the flux generated by the current flowing in side pincushion inductance winding 25 flows in center leg 21c in the same direction as the flux generated in leg 21a by the current flowing in linearity inductance winding 23.

The horizontal deflection current flowing in linearity winding 23, and, thus, the flux developed by this current flowing in outer leg 21a, is smaller at the top and bottom of the raster than in the center. However, the current flowing in side pincushion correction inductance of the East-West ITR modulator, and, thus, the flux flowing in center leg 21c, developed by this current is larger at the top and bottom of the raster than in the center. The increasing flux in center leg 21c compensates for the decreasing flux produced by linearity winding 23. Thus the flux produced by winding 25 changes the magnetic bias of leg 21a in a manner which corrects for the undesirable change in magnetic bias caused by the vertical rate component of the current flowing in linearity inductance winding 23.

Since the L-shaped portion of core 21 that is outer leg 21a and center leg 21c is partly or completely in saturation, no undesirable modulation of the side pincushion correction current flowing in winding 25 occurs. Because of the E-core geometry for core 21 and because of the placement of windings 23 and 25 around opposite outer legs of E-core 21, a comparatively high reluctance path exists for the flux mutually linking both windings 23 and 25. Leg 21a is therefore biased near saturation by magnet 22, whereas the bias point of leg 21b is in the relatively linear region of the B-H hysteresis curve. Thus, the mutual flux linking windings 23 and 25 has a relatively large compensating effect on the inductance of linearity winding 23 but has a relatively small effect on the inductance of side pincushion correction winding 25.

Figure 3:
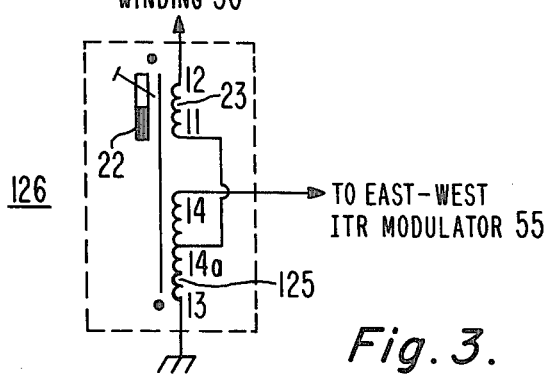
FIG. 3 illustrates that portion of the schematic of FIG. 2 including another combined arrangement embodying the invention.
Figure 4:
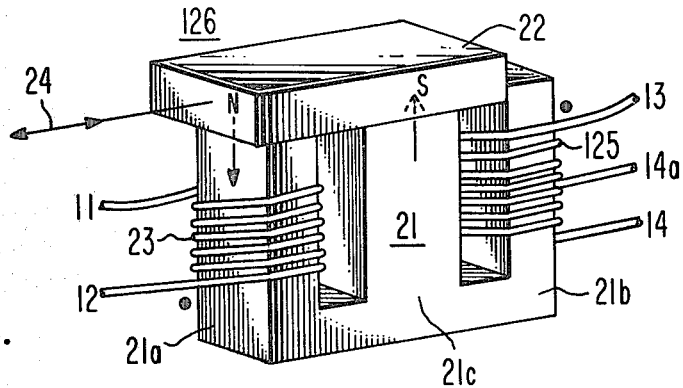
FIG. 4 illustrates another combined linearity and side pincushion correction magnetic structure embodying the invention, the magnetic structure being associated with the schematic of FIG. 3.

FIG. 3 illustrates that portion of the electrical schematic circuit of FIG. 2 associated with another combined linearity and side pincushion structure 126 embodying the invention, similar to the structure 26 of FIG. 1. FIG. 4 illustrates the core, winding and magnet arrangement for structure 126. In FIGS. 3 and 4, a transformer, comprising a tapped winding 125, is substituted for the side pincushion correction winding 25 of FIGS. 1 and 2. A tap lead conductor 14a instead of the lead conductor 14 of FIGS. 1 and 2, is now coupled to lead conductor 11 of linearity inductance winding 23. The circuit arrangement of FIG. 3 has the advantage that the current through ITR 54 is transformed down which results in lower dissipation in the device. Also a smaller valued capacitor 53 is required.

Figure 5:
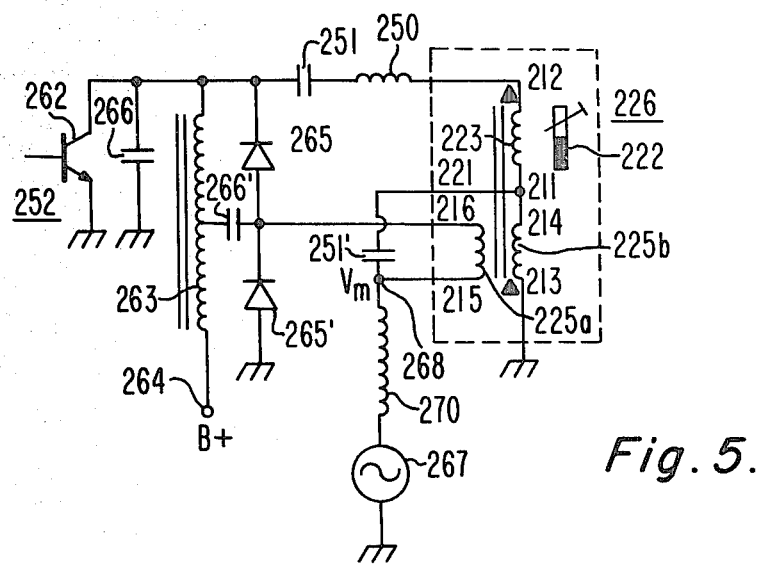
FIG. 5 illustrates an electrical schematic of a deflection circuit, including another modulator circuit and another combined linearity and side pincushion correction arrangement embodying the invention.
Figure 6:
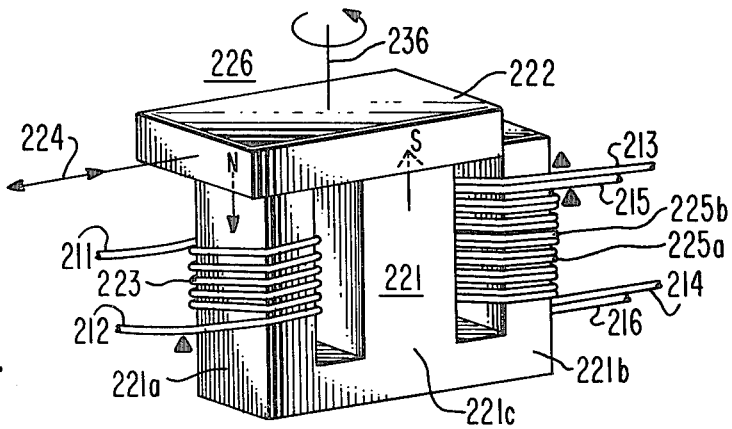
FIG. 6 illustrates a combined linearity and side pincushion correction magnetic structure embodying the invention, the magnetic structure being associated with the schematic of FIG. 5.

Modulator circuits other than East-West ITR modulator circuit 55 of FIG. 2 may be coupled to a combined linearity and side pincushion correction structure embodying the invention. As illustrated in FIG. 5, a diode modulator circuit 255 may be coupled to a combined linearity and side pincushion correction structure 226. As illustrated in FIG. 6, structure 226 is generally constructed similar to the construction of structures 26 and 126 of FIGS. 1 and 4. An E-core 221 includes a first outer leg 221a, a center leg 221c, and a second outer leg 221b. A linearity inductance winding 223 is wound around outer leg 221a. A bias magnet 222, slidable along the line 224, and rotatable about an axis 236, is in contact with legs 221a and 221b but is not in close contact with leg 221b.

Wound around outer leg 221b is a diode modulator side pincushion correction inductance winding 225a. Concentrically wound with winding 225a is a transformer coupled secondary winding 225b.

As illustrated in FIGS. 5 and 6, a lead conductor 213 of secondary winding 225b is coupled to ground and a lead conductor 214 is coupled to a lead conductor 211 of linearity inductance winding 223. A lead conductor 212 of winding 223 is coupled to a horizontal deflection winding 250.

Horizontal deflection winding 250 is coupled to the collector of a horizontal output transistor 262 of a horizontal deflection generator 252 through a trace capacitor 251. The transistor is switched at a horizontal rate by a conventional horizontal oscillator and driver circuit, not illustrated. The collector of transistor 262 is coupled through a winding of a horizontal output or flyback transformer 263 to a B+ supply voltage developed at a terminal 264. A damper diode 265 and retrace capacitor 266 are coupled to transistor 262.

Diode modulator circuit 255 includes a diode 265', a capacitor 266', a capacitor 251' and a modulation voltage source 267 coupled to capacitor 251' through an inductor 270. Modulation voltage source 267 provides a vertical rate parabolic voltage Vm at a terminal 268, with voltage Vm having a minimum at the center of vertical trace.

As illustrated in FIGS. 5 and 6, a lead conductor 215 of side pincushion correction inductance winding 225a is coupled to terminal 268 and a lead conductor 216 is coupled to the junction of diodes 265 and 265'. Diode 265', capacitors 266' and 251' of diode modulator circuit 255 function analogously to respective diode 265, and capacitors 266 and 251 associated with horizontal deflection generator 252 for developing a horizontal sawtooth correction current in side pincushion correction inductance winding 225a. The values of capacitors 266 and 266' and the location of the tap on flyback transformer winding 263 are selected such that the currents flowing in deflection winding 250 and in winding 225a have the same horizontal retrace time.

The amplitude of the sawtooth current flowing in winding 225a is modulated in a parabolic vertical manner. This modulated sawtooth current is transformed by secondary winding 225b to provide a parabolic vertical rate amplitude modulated sawtooth component to the horizontal scanning current, thereby providing the required side pincushion distortion correction. With the exception of combined linearity and side pincushion correction structure 226, the circuit of FIG. 5 is similar in operation to arrangements described in the aforementioned U.S. Pat. No. 4,024,432 by A. Boekhorst and U.S. Pat. No. 3,906,305 by A. H. H. J. Nillesen.

With the lead conductors of windings 223, 225a and 225b as described above, the relative winding polarities of the three windings are indicated by the polarity triangles of FIGS. 5 and 6. Accordingly, a compensating flux is developed by the current in winding 225a. This flux is coupled to leg 221a of FIG. 6, thereby preventing undesirable changes in the magnetic bias of leg 221a from occurring, as was described similarly for the structure of FIG. 1 and the circuit of FIG. 2, for example.

With the arrangements embodying the invention, as illustrated in FIGS. 1–6, one magnetic component 26, 126 and 226 replaces two separate components. For example, a conventional linearity coil may use one ferrite rod core and two magnets and a separate E-W modulator structure may use a separate UU, EE or rod core. With the inventive embodiments as described, compensatory modulation of the linearity inductance at a vertical frequency rate is obtained by a single structure which also functions to provide, without additional complexity, or separate support housing, a side pincushion correction inductance.

Selected component values for elements of FIGS. 1 and 2 and selected dimensions that are indicated in FIG. 1 are as follows:

| | |
|---|---|
| Capacitor 51: | 1.0 microfarad |
| Deflection Winding 50: | 1.18 millihenry |
| | 1.05 ohms |
| Horizontal Deflecting Current Peak-to-Peak Amplitude, uncorrected for pincushion distortion equals 5.4 ampere peak-to-peak. | |
| Type of kinescope used is A67-700X. | |
| Amount of E-W Pincushion Correction Required is 8%. | |
| Combined Linearity and Pincushion Distortion Correction Structure 26: | |
| E-core 21: | cross-sectional area of an outer leg: 30.5 sq. m.m. |
| | cross-sectional area of center leg: 57 sq. m.m. |
| | full height of a leg: 21.3 m.m. |
| | full length of E-core: 25.8 m.m. |
| | center line to center line separation of an outer leg from the center leg: 10.8 m.m. |
| E-core 21 material: | B32 Cofelèc (ferrite). |
| Magnet 22: | length: 12 m.m. |
| | width: 25 m.m. |
| | thickness: 6 m.m. |
| | material: ferrite |
| | North, South Pole Strength 400 gauss |
| Winding 23: | 67 turns of 0.5 m.m. enameled copper wire |
| Winding 25: | 53 turns of 0.5 m.m. enameled copper wire |

E-core 21 may be similar to E25 Cofèlec B32 manufactured by Cofèlec, France.

Magnet 22 may be similar to the magnet used in a N-S pincushion transductor, such as Orèga 5712 manufactured by Orèga, France.

What is claimed is:

1. A magnetic structure for providing both side pincushion and linearity correction to horizontal scanning current in a raster scanning system, comprising:
   a magnetic core, including first and second core portions;
   a first winding wound around said first core portion;
   a second winding wound around said second core portion;
   magnetic biasing means for providing a magnetic bias flux in said first and second core portions, the disposal of said magnetic biasing means relative to said first and second core portions being such that (a) said first core portion is biased near saturation so that coupling of said first winding to a horizontal deflection winding can provide linearity correction to horizontal scanning current flowing in said horizontal deflection winding and (b) said second core portion is biased in a substantially linear region of its magnetization characteristic so that coupling of said second winding to said horizontal deflection winding and to a side pincushion modulation source can provide side pincushion correction to said horizontal scanning current, said first and second core portions cooperating to establish a path of a given reluctance for mutual flux linking said first and second windings, the winding polarities of said first and second windings and the magnitude of said given reluctance being such as to enable flux generated by said second winding to compensate for undesirable changes during vertical scan of the magnetic bias of said first core portion.

2. A structure according to claim 1 wherein said second winding comprises a modulator inductance for said side pincushion correction circuit.

3. A structure according to claim 2 wherein said magnetic core comprises an E-core, said first and second core portions being outer legs of said E-core.

4. A structure according to claim 3 wherein said magnetic biasing means comprises a permanent magnet contacting only said first core portion and a center leg of said E-core.

5. A deflection circuit including a combined side pincushion and linearity correction magnetic structure, comprising:
   a horizontal deflection winding;
   a horizontal deflection generator coupled to said horizontal deflection winding for producing scanning current in said horizontal deflection winding;
   a side pincushion correction modulator circuit; and
   a combined side pincushion and linearity correction magnetic structure comprising:

a magnetic core, including first and second core portions;

a linearity winding wound around said first core portion and coupled to said deflection winding;

magnetic biasing means for generating a first bias magnetic flux in said first core portion and a second bias magnetic flux in said second core portion, said first bias magnetic flux establishing a magnetic bias in said first core portion near saturation for providing a linearity corrected scanning current in said horizontal deflection winding; and a side pincushion correction winding wound around said second core portion and coupled to said side pincushion correction modulator circuit and to said horizontal deflection winding, the magnetic bias of said second core portion established by said second bias magnetic flux being such as to enable said side pincushion correction winding to exhibit a substantially linear inductance of sufficient magnitude to provide substantial side pincushion correction to said scanning current, the amount of magnetic coupling between said linearity and side pincushion correction windings sufficient to compensate for an undesirable vertical rate modulation of said magnetic bias of said first core portion caused by said side pincushion corrected scanning current without substantially disturbing said side pincushion correction.

6. A circuit according to claim 5 wherein said first core portion is biased into magnetic saturation each horizontal deflection cycle and wherein the bias of said second core portion remains in the substantially linear region during modulator circuit operation.

7. A circuit according to claim 6 wherein said magnetic core comprises an E-core with said first and second core portions, each portion comprising an outer leg of said E-core.

8. A circuit according to claim 7 wherein said magnetic biasing means comprises a permanent magnet not in close contact with said second core portion.

* * * * *